March 14, 1967  R. SINDEN ET AL  3,308,971

STACKING ATTACHMENT FOR A HAY BALER

Filed Aug. 10, 1964  3 Sheets-Sheet 1

INVENTORS
Roland Sinden
Dean Sinden
John Sinden

BY Frank C. Lowe
— ATTORNEY

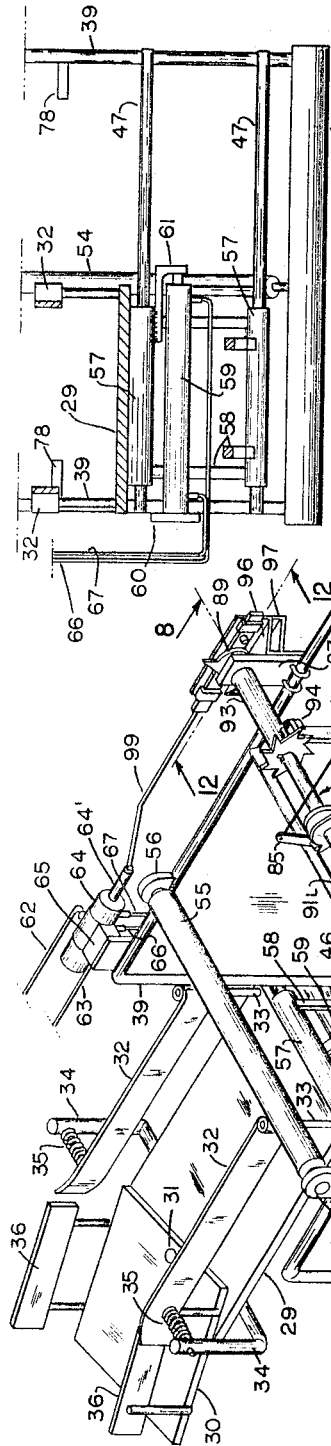

United States Patent Office 3,308,971
Patented Mar. 14, 1967

1

3,308,971
STACKING ATTACHMENT FOR A HAY BALER
Roland Sinden, Dean Sinden, and John Sinden, all of Craig, Colo., assignors to Roland Sinden, Dean Sinden, and John Sinden, all of Craig, Colo.
Filed Aug. 10, 1964, Ser. No. 388,520
8 Claims. (Cl. 214—6)

This invention relates to hay baling operations and more particularly to apparatus for bunching and stacking hay bales after they are formed and tied by the baling machine. Accordingly, the invention will be hereinafter referred to as a stacking attachment for a hay baler, or sometimes as a bale stacker.

Hay harvesting operations have been radically altered by the introduction of fast-moving vehicles which are equipped with front end fork loaders of the type which can move to a small group or stack of hay bales in the field, move the fork under the hay bales, lift the same and rapidly carry them to their destination. While fork type loaders, of this general type, have been manufactured in many different sizes and are carried on many different types of vehicles, one general development has been to use a fork lift of a size which is best capable of picking up a stack of eight bales arranged in two layers, the four bales per layer forming a rectangular pattern of side-by-side, end-to-end pairs. Such an arrangement approaches the capacity of a light-weight, fast fork lift unit, both in lift power and in space considerations.

In conventional hay field operations, the bales are deposited in the field as soon as they are tied by the baling machine. Sometimes groups of bales may be wind-rowed by a simple type of stacking apparatus drug by the baling machine. A fork lift type vehicle then traverses the field with a driver and a field hand, and as the vehicle approaches a bale, it slows down, the field hand throws the bale onto the fork lift and arranges the bales in a neat manner to make up an eight-bale, two-tier stack. The vehicle then carries the stack to the main storage stack where the fork lift properly places them on the main stack. Another mode of operation possible where the bales are grouped together is for the field workers to gather and stack the bales in eight-bale, two-tier stacks to permit the fork lift loader to then pick up the stacks and carry them to the main loading area without the use of an extra man on the loader.

It is immediately obvious in this procedure of operation that a substantial advantage could be gained in reducing labor costs if the bales could be initially deposited in the field as eight-bale, two-tier stacks as they are formed in the baler, for then the fork lift operator will merely have to pick up and convey these stacks to the main storage stack without the need of additional help.

The present invention was conceived and developed to gain such an advantage, and it comprises, in essence, a bale stacking apparatus which may be attached to the rearward discharge chute of a standard baling machine. Thus it may be towed by the baling machine. Such apparatus must be capable of receiving the bales as they are discharged, and then arrange them in an eight-bale, two-tier stack and finally release the stack as soon as it is formed.

It follows that another object of the invention is to provide a novel and improved stacking attachment for a hay baling machine which is adapted to be towed by the baling machine and is adapted to sequentially receive and arrange, and then release eight hay bales at a time, as neatly arranged, two-tier stacks which are especially adapted to be lifted and transported by fork life loader vehicles.

Another object of the invention is to provide a novel and improved stacking attachment for a hay baling machine which is fully automatic in its operation and which will receive, arrange and deposit eight-bale, two-tier stacks without requiring any attention and adjustment by the operator on the hay baling machine.

A further object is to provide a stacking attachment which may be easily connected to any conventional type of hay baling machine and which may be towed by the machine without interfering with the regular movements of the machine.

Another object of the invention is to provide a novel and improved hay bale stacker which is a simply constructed unit and may be used by untrained workmen, and which is further, a rugged and durable unit.

With the foregoing and other objects in view, all of which more fully hereinafter appear, our invention comprises certain constructions, combinations and arrangements of parts and elements as hereinafter described, defined in the appended claims and illustrated in preferred embodiment in the accompanying drawing in which:

FIGURE 4 is a front elevational sectional view as taken from the indicated line 4—4 at FIG. 3.

FIGURE 5 is an isometric view as from the rear left hand corner of the bale stacker.

FIGURE 6 is a fragmentary sectional detail as taken from the indicated line 6—6 at FIG. 5.

FIGURE 7 is a fragmentary sectional detail similar to the showing at FIG. 6, but with the operative components in an alternate position.

FIGURE 8 is an enlarged sectional view of the cam shaft control as taken from the indicated line 8—8 at FIG. 5.

FIGURE 9 is a fragmentary sectional detail as taken from the indicated line 9—9 at FIG. 8, but on an enlarged scale.

FIGURE 10 is a fragmentary sectional detail as taken from the indicated line 10—10 at FIG. 9, but on a further enlarged scale.

FIGURE 11 is a fragmentary sectional detail as taken from the indicated line 11—11 at FIG. 8, but on an enlarged scale.

FIGURE 12 is a fragmentary sectional detail as taken from the indicated line 12—12 at FIG. 5 and at FIG. 8, but on an enlarged scale.

Figure 1:
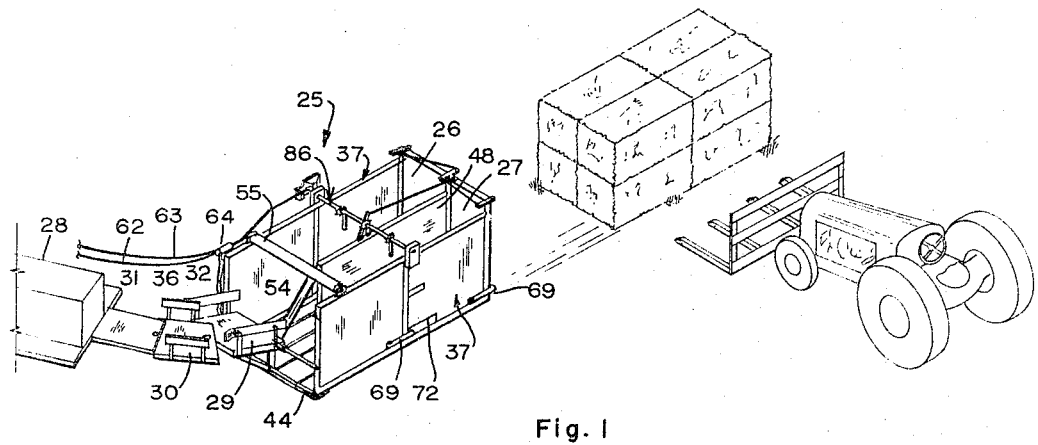
FIGURE 1 is an isometric, diagrammatic view of a fragment of the rear discharge chute of a baling machine, of the improved bale stacking attachment connected to the machine, of a stack of bales discharged by the apparatus and of a front end type loading vehicle positioned to approach and lift the stack.
Figure 2:
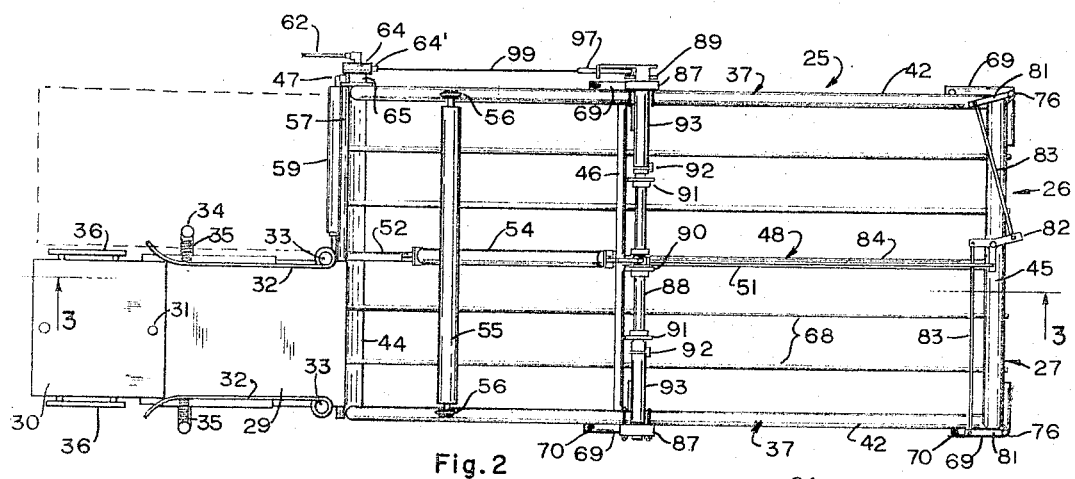
FIGURE 2 is a plan view of the bale stacking attachment per se with the bale receiving chute being illustrated at an initial position for the commencement of a stack-forming cycle and with broken lines indicating another position the chute may assume for a stack-forming cycle.

FIGURES 13 through 23 are diagrammatic sketches of the bale stacking attachment illustrating in a diagrammatic manner the sequential movement of bales into the apparatus until a stack is formed and the subsequent release of the stack, and more specifically, FIGS. 13, 18 and 23 illustrate the apparatus in plan view, FIGS. 14 through 17 illustrate the right hand compartment of the apparatus in elevational view and FIGS. 19 through 22 illustrate the left hand compartment of the apparatus in elevational view.

Referring more particularly to the drawing, the improved bale stacker 25 is formed generally as a box-like unit divided into two longitudinal compartments which may be designated as a right hand compartment 26 and a left hand compartment 27, facing the direction of movement of the apparatus. This stacker is adapted to be attached to the rear end of a hay baling machine 28, to be towed by the machine and to receive hay bales as they are formed and discharged from the hay baling machine. When it is filled with hay bales, it will then open to release the entire stack from its rear end, and the process of filling will then commence again.

The bales are guided from the baling machine 28 and into a compartment in the stacker 25 by a chute 29 affixed to the front end of the stacker, the chute being adapted to shift from one side of the machine to the other to align with the individual compartments by means hereinafter described. Since the stacker will be towed by the baling machine 28, the leading end of the chute 29 is conveniently attached to the trailing end of the baling machine, but with an intermediate guide plate 30 between the two. The guide plate 30 is connected to the end of the baling machine and to the chute by centrally-positioned pivot pins 31 so that it functions as an articulated member whenever the hay baling machine makes a turn during its movement about a field.

To facilitate guiding a hay bale into one of the compartments in the stacker 25, especially when a turn occurs, the chute 29 is equipped with side rails 32. These side rails are pivotally carried on posts 33 at the rearward portion of this chute, and the front end of each rail is adapted to swing outwardly a small distance from a normal alignment and against outwardly spaced posts 34 near the front end of the chute. They are, however, resiliently urged to the normal position by compression springs 35 between the side rails 32 and the posts 34. The intermediate guide plate 30 is also equipped with suitable side rails 36 to further facilitate guiding a bale into the apparatus, especially when the baling machine is making a turn in the field and the stacker is not in line with the baling machine.

The bale stacker 25 is formed as a light-weight, sled-like unit having a skeletal framework of welded structural members, which are preferably tubes, with sheet metal enclosing selected panel portions of the skeletal frame. A longitudinally-disposed panel 37 is formed at each side of this frame by a slide tube 38 at the base, from whence upstands a front post 39, an intermediate post 40 and a rear post 41, and the panel frame is completed by a longitudinal top rail 42. Each panel 37 is enclosed by a sheet 43.

These two panels 37 are interconnected by a transverse deflector 44 at the base of the front end of the stacker and a transverse cross bar 45 at the top of the rear end of the stacker. The deflector 44 functions as the leading edge of the sled-like unit and is preferably a rounded member as illustrated, to prevent the unit from digging into the ground and at the same time to protect hay bales within the stacker as it is being pulled over the ground. Other transversely-disposed members interconnecting the panels 37 which also are used for other purposes include an intermediate cross bar 46 at the top of the stacker near the central portion thereof and a pair of carrier bars 47 which are affixed to the front posts 39 at the lower portion thereof to carry the chute 29 as in a manner hereinafter described.

A longitudinally-disposed divider panel 48 is positioned between the side panels 37 to define the compartments 26 and 27. This panel is suspended from the rear cross bar 45 and the intermediate cross bar 46, preferably with its lower edge being off the ground. This panel includes an intermediate post 49, a rear post 50, a top rail 51 between the posts 49 and 50 and a bottom rail 52 which extends from the base of the rear post to the intermediate post and thence to the top edge of the front deflector 44. The area encompassed by the posts 49 and 50 and the top and bottom rails 51 and 52 is enclosed by a sheet 53.

The front portion, forwardly of the intermediate post 49 of the divider panel 48 is open, and an inclined guide roller 54 extends downwardly from the top of that post and forwardly therefrom to connect with the bottom rail 52 adjacent to its front end connection with the front deflector 44. This roller functions to assist in aligning and guiding a hay bale into one compartment or the other. A second transversely-disposed guide roller 55 is mounted in bearings 56 at the top of rails 42, at a position near the front of the apparatus to facilitate in guiding a bale into a compartment by preventing any tip-up or buckling of the bales.

The bale receiving chute 29 is mounted upon the transverse carrier bars 47 at the front of the stacker. Slide tubes 57 are mounted upon each bar 47 and struts 58 are arranged to interconnect these tubes and to attach the chute 29 thereto in a rigid arrangement so that the tubes 57, struts 58 and chute 29 move as a unit transversely across the front of the stacker, on the bars 47, to thereby place the chute 29 in line with either the right or left hand compartment of the stacker.

A substantial force may be required to effectuate such movement since it will necessitate a lateral shifting of the stacker itself while it is being towed by the hay baling machine 28. This movement of the chute is accomplished by a transversely-disposed, double-acting cylinder 59 which is mounted upon a bracket 60 on a front post 39 at the side of the stacker. The cylinder extends underneath the chute, and its piston is attached to a bracket 61 on the upper slide tube 57. Since the movement thereof must be substantially the entire width of the stacker, the length of the cylinder must be somewhat greater than one-half the width of the stacker and the bracket 61 may be formed in an offset manner as illustrated at FIG. 4 to provide for necessary clearance.

This cylinder is actuated by hydraulic pressure and such is almost always available on farm equipment. Therefore, a supply line 62 and return line 63 from any conventional source, not indicated on the drawing, is used in connection with operation of the cylinder. These lines extend to a four-way valve 64 which is mounted upon a bracket 65 at the top of the post 39 above the cylinder 59. Other hydraulic lines 66 and 67 extend from the valve to the ends of the cylinder to effect double action of its piston in a conventional manner. The four-way valve is illustrated as being of a spool type and is operated to shift from one side to another by a plunger 64' extending from one side of the valve. The plunger is connected to and is shifted by a control mechanism hereinafter described.

The bottom of this stacker is open and a series of slide bars 68 are attached to the lower edge of the front deflector 44 to extend rearwardly therefrom. Whenever a bale of hay is dropped into a compartment, it will rest upon these slide bars, but ground stubble and the like will nevertheless contact the bottom of the hay bale to naturally tend to move it rearwardly in the compartment as the stacker is towed forwardly. However, at the same time, the slide bars tend to hold the bales in position in the stacker. It was found that by selection of the number of slide bars, usually two or three in each compartment, a balance could be obtained so that a comparatively moderate force would hold a bale in position in the stacker against the back-dragging action of ground stubble whenever the stacker was pulled forwardly. Thus, the bale movement through the apparatus may be easily controlled, as will now be set forth.

As hereinafter set forth in detail, it is desired to move the bales through a compartment in pairs, with one bale being stacked on top of another. The first step is to deposit a pair of bales, one on top of the other, in the front portion of a compartment which lies between the front post 39 and intermediate post 40 of a side panel 37. For example, this pair of bales may be deposited in the right compartment 26. The pair then moves to the rear section of the compartment 26 and two more bales are placed in the front section of that compartment to fill it. The chute 29 is then shifted to fill the left compartment 27.

When both compartments are filled, all of the bales are released from the rear of the stacker.

Figure 3:
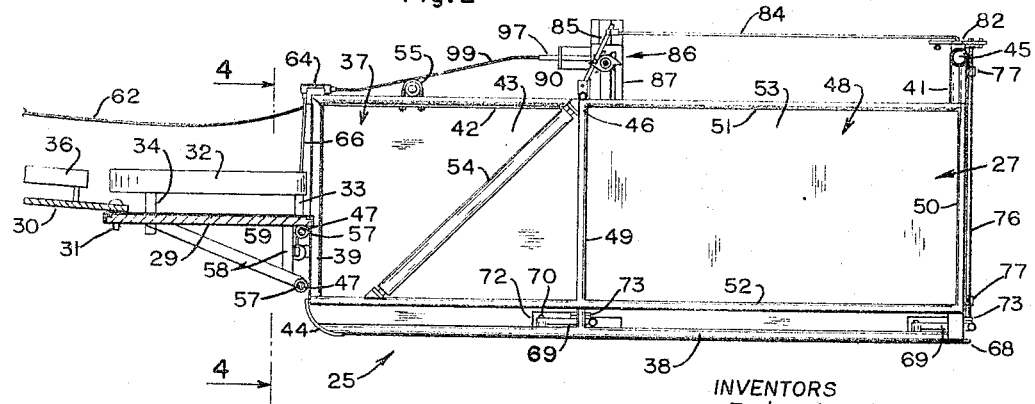
FIGURE 3 is a longitudinal, sectional, elevational view as taken from the indicated line 3—3 at FIG. 2.

These operations require two stop arms 69 in each compartment of the stacker, one being at an intermediate position, and the other being at the rear position of the stacker, as in the manner shown at FIGS. 3 and 4 of the drawing. These arms are positioned near the base of the stacker and are pivotally connected to the slide tube 38 to swing into the adjacent compartment to contact a bale therein which is lying upon the slide bars 68.

Each arm 69 is formed as a right-angle bend. One portion, a swinging portion 69', of the arm is connected to a pivot 70 carried upon a bracket 71 on slide tube 38. Each pivot is located so that the swinging portion 69' of the arm will extend rearwardly from the pivot and the other portion, a bale-intercepting portion 69'', of the arm will swing about its adjacent panel post, either the intermediate post 40 or the rear post 41, and into the compartment. To permit clearance about the intermediate post, a slot 72 is formed in the sheet 43. Thus, when the swinging portion 69' of the arm is substantially parallel to the tube base 38, the bale-intercepting portion 69'' reaches into the compartment to intercept a bale and hold it in position against the dragging action as it is pulled over the ground.

However, each arm may swing outwardly on its pivot 70, and the bale-intercepting portion 69'' will then move out of its compartment to permit a bale to move rearwardly through the stacker. This outward swing is the normal action of each arm 69 and a lock means is provided to hold it in the inward intercepting position, of a type which is easily released when desired. A two-link lock 73 is used for this purpose. A first, longer link 74 has one end pivotally attached to the arm near its angle bend, or elbow. A shorter link 75 has one end pivotally connected to the other end of link 74, and the opposite end of the shorter link 74 is held by a vertical rod 76. The rod 76 is secured to the adjacent side panel post, the post 40 or 41, as in the bearings 77. Accordingly, the links may spread apart or overlap as the rod 76 rotates, and the length of the two links 74 and 75 is such that they will overlap into a common alignment whenever the intercepting arm portion 69'' extends into its compartment. In such a position, the links are naturally locked and may resist a substantial force of a hay bale bearing against the arm portion 69''. However, with a very slight rotation of the rod 76, the links 74 and 75 will move out of such alignment, and a very slight force will then cause them to easily spread apart to permit the arm portion 69'' to swing out of the compartment, as in the manner illustrated at FIGS. 6 and 7.

Each rod 76 connecting to the link 75 of the lock 73 at each intermediate post 40 extends upwardly on the post, in the bearings 77, and terminates as an inwardly extending trip lever 78 located at an upper level of the stacker frame where it may be contacted by the upper bale of a pair where one bale is on top of the other. A slot 79 is provided in the sheet 43 of the panel 37 to permit the lever 78 to swing clear as the bales move therepast. A spring 80 is mounted on each rod 76 and is associated with each lever 78 and arm 69 to urge the arm 69 to the bale-intercepting position where the links automatically lock together.

Each rod 76 connecting to the link 75 of the lock 73 at each rear post 41 extends upwardly on the post 41, in the bearings 77, and terminates as a longitudinally-disposed, forwardly-directed trip lever 81, above the posts 41. A cord 83 connects each trip lever 81 to opposing, longitudinally-disposed arms of the T-lever 82 which is pivotally mounted on top of the cross bar 45, at the center thereof. The leg of the T-lever 82 is connected to a forwardly-extending pull cord 84, which extends forwardly from the lever and is connected with a cam follower arm 85, as will be further described. It is to be noted that the pulling of the cord 84 to rotate the T-lever also pulls cord 83 to rotate the trip levers 81 and cause both arms 69 at the rear of the stacker to open simultaneously as to release all bales from both compartments of the stacker. A spring 80 is mounted on each rod 76 and urges the arms 69 to their inward locking position when no bales are in the compartment.

The sequence of filling the stacking apparatus is necessarily cyclic in manner, and a cam assembly 86 to operate the shifting of chute 29 and the arms 69 is mounted upon a transversely-disposed rod above the stacker and in suitable brackets 87 upstanding from each side panel 37. This cam assembly 86 is positioned at the intermediate section on the stacker to be actuated by movement of bales in either compartment, as from the forward section to the rear section of the compartment. This cam assembly 86 is carried upon a shaft 88 which rotates in the brackets 87. Two cams 89 and 90 and a pair of drive sprockets 91R and 91L are mounted on this shaft, as will be further described.

A complete sequence of operations involves eight cyclic movements of bales shifting from the forward section to the rear section of a compartment. Two stacks of bales will be released during this sequence, as will be described. Accordingly, the shaft 88 is adapted to rotate 45 degrees with each cyclic movement. This is accomplished by the use of 8-point drive sprockets 91R and 91L positioned over each compartment 26 or 27 near the center portion thereof.

A first cam 89 is positioned at one side of the bale stacker and is adapted to operate the four-way valve plunger 64'. This cam has a single lobe, but operates against opposing follower wheels and is thus adapted to shift the chute twice in the eight cycles of operation. The cam 90 is positioned at the center of the apparatus and is adapted to shift the follower arm 85 to release bales from the apparatus. This cam has two lobes and is adapted to function twice in the eight cycles of operation.

The drive sprockets 91L and 91R are actuated by hanging rods 92 which are attached to sleeves 93 carried on the shaft 88 alongside the sprockets. The rods 92 depend from the shaft and are tipped at least 45 degrees whenever a pair of bales are moved from the forward section of a compartment to the rear section thereof. A detent 94 is mounted on each rod 92 adjacent to the sprocket to engage the sprocket for rotation while tipping, but to release when the rods drop back to their initial, vertical position so that reverse movement of the rods 92 will not be accompanied by reverse movement of the shaft 88.

The cam 89 at the end of the shaft includes a single lobe 95 which functions only through a 45-degree rotation of the shaft. A shift bar 96 is slidably held by a frame bracket 97 alongside this cam 89. A follower 98 is carried on this shift bar at each side of the cam in diametrical opposition with the other follower. A connector rod 99 extends from one end of the shift bar to the plunger 64' of the four-way, chute-shifting valve 64. It follows that whenever the shaft rotates a full turn, the lobe 95 will contact a first follower 97 to move the shift bar 96 to a first position where it will remain and then contact the second follower 97 to move the bar 96 to a second position. Such shifting operations are in sequence and are 180 degrees apart insofar as rotation of the shaft 88 is concerned.

The cam 90 at the center of the shaft includes two opposing lobes 100, each of which functions through a 45-degree rotation of the shaft. The follower arm 85 includes a follower 101 which contacts the cam 90 and this arm is mounted upon a suitable pivot connection 102 on the top rail 51 of the divider panel 48, in a position adjacent to the position of the cam 90.

The operation of the apparatus through eight cycles, to deposit two stacks of bales, may be initiated with the stacker empty, the receiving chute 29 aligned with one compartment, say, for example, the right compartment 26. In this state, the end cam 89 is rotated 90 degrees from actuation and the central cam is rotated 180 degrees from actuation.

The actual sequential movement of bales into the stacker is then as in the manner illustrated at FIGS. 13 through 23. The first bale A moving into the apparatus over the chute 29 drops into the forward section of the compartment 26, as illustrated at FIG. 13. Upon dropping into this compartment, it is held in position by the intermediate intercept arm portion 69" and a second bale B is subsequently pushed upon top of bale A to make up the first pair, as illustrated at FIG. 14. When it is in position on top of bale A, it trips the lever 78 to release the pair of bales, and they move to the rear of the compartment 26. This movement of bales A and B tips the rod 92 in compartment 26 to effect the first cyclic movement of the shaft 88 as at FIG. 15.

At the same time bale C is moving into the forward section of compartment 26. Bale C drops into the forward end of the right compartment, and bale D is pushed upon it to make up the second pair, as indicated at FIG. 16. When bale D trips the lever 78 to release this pair of bales, they move rearwardly and are pushed against bales A and B. The length of the apparatus exceeds the length of two bales end on end. This permits a rearward movement of bales C and D of sufficient extent to leave a space between the bale D and bale E, the next incoming bale, as in the manner shown at FIGS. 17 and 18. This clearance is important in that it permits a lateral shifting of the bale E to the other side of the apparatus without interference by bale D, as will now be described.

This movement of bales C and D also tips the rod 92 in compartment 26 to effect the second cyclic movement of the shaft 88. This second cycle of the operation rotates the end cam 89 through 90 degrees to move the shift bar 97 and to thereupon reset the four-way valve 64. This action immediately forces the receiving chute to move laterally and become aligned with the left compartment 27 of the stacker.

Bale E is thereupon deposited into the front section of the compartment 27 as at FIG. 18. Next, bale F is pushed upon bale E, FIG. 19, to form the third pair. Bale F also trips the lever 78 to release the pair of bales, and they move to the rear of the compartment 27. This rearward movement tips the rod 92 in that compartment to effect the third cyclic movement of shaft 88, as at FIG. 20.

At the same time, bale G drops into the forward section of the left compartment 27, and bale H is pushed upon top of bale G. When bale H again trips the lever 81 to release the left stop, bales G and H move rearwardly, again tipping the rod 92 and effectuating the fourth cycle shaft rotation, FIGS. 21 and 22.

The fourth cycle rotates the shaft 180 degrees, and a lobe 100 of cam 90 contacts the cam follower 101 on arm 85 to release the rear arm locks 73 and permit the arms 69 to swing outwardly. All of the bales in both compartments then move out of the stacker, completing the first half of the overall sequence of operation, as indicated at FIG. 23.

The subsequent four cycles to complete the sequence are identical but in reverse order, that is to fill compartment 27 first and then compartment 26, before releasing the second stack of bales as compartment 26 is filled.

We have now described this preferred embodiment of our invention in considerable detail; however, it is obvious that others skilled in the art can build and devise alternate and equivalent constructions which are nevertheless within the spirit and scope of our invention. Hence, we desire that our protection be limited, not by the constructions illustrated and described, but only by the proper scope of the appended claims.

We claim:

1. A hay bale stacker adapted to be connected with and towed by a hay baling machine to receive eight bales of hay as they are discharged from the machine, to arrange the bales in a stack two bales high, two bales wide and two bales long and to release the stack when it is completed, and comprising in combination therewith:

(a) a box-like body including longitudinal side walls and a longitudinal central wall dividing the same into two compartments, and proportioned such that the width of each compartment is slightly greater than the width of the hay bale, the height of each compartment is slightly greater than the height of two hay bales and the length is greater than the length of two hay bales placed end to end;

(b) a plurality of longitudinally extended rods disposed across the bottom of the body to lie upon the ground and being adapted to partially support hay bales lying thereon to permit the bales to also partially contact the ground surface, whereby to facilitate the holding of hay bales within the body while it is moving and while the stack is being formed and to permit the hay bales to slide rearwardly from the body after the stack is formed;

(c) a chute at the front end of the body adapted to be normally in alignment with one compartment to receive bales from the machine and to guide the same into the compartment, said chute being at a height adapted to permit one bale to be moved on top of another;

(d) a shifting means at the front end of the body adapted to shift the chute laterally across the body from alignment with one compartment to alignment with the other compartment;

(e) a holding means traversing the compartments at the rear of the body adapted to normally hold bales within the compartments, but being releasable to release bales therefrom;

(f) a trigger means in each compartment adapted to actuate responsive to movement of bales within the compartment when the compartment is filled with bales; and, (g) a control means adapted to be actuated by actuation of either trigger means to initiate shifting of the shifting means whenever one compartment is filled with four hay bales and to initiate releasing of the holding means whenever both compartments are filled with hay bales to release the stack from the compartment.

2. In the stacker defined in claim 1, including an intermediate holding means traversing the compartments adapted to normally hold a first bale within the forward end of a compartment until a second bale is deposited upon the first bale and a releasing means adapted to be tripped by the second bale when positioned upon the first and being adapted to thereupon release the intermediate holding means to permit the bales to thereupon shift to the rear of the compartment and provide room for two additional bales in the forward end of the compartment.

3. In the organization set forth in claim 1, wherein the control means includes a transversely disposed shaft extending across the body, cam means on the shaft having followers adapted to actuate the shifting means and the holding means when the shaft rotates, and wherein the trigger means in each compartment are adapted to rotate the shaft responsive to movement of bales within the compartment.

4. In the organization set forth in claim 3, wherein said cam means are adapted to alternatively actuate the holding means and the shifting means.

5. In the stacker defined in claim 1, including an intermediate holding means traversing the compartments adapted to normally hold a first bale within the forward end of a compartment until a second bale is deposited upon the first bale and an intermediate releasing means adapted to be tripped by the second bale when it is positioned upon the first and being adapted to thereupon release the intermediate holding means to permit the bales to thereupon shift to the rear of the compartment and provide room for two additional bales in the forward end of the compartment, and wherein said control means includes a transversely disposed shaft extending across the top of the body, said trigger comprises detents extending from the shaft into each compartment and being adapted to contact bales as the intermediate holding means releases to permit bales to move from the forward to the rearward end of the compartment, the control means including further, cams upon the shaft and followers extending therefrom adapted to actuate the shifting means and holding means as the shaft rotates, said cams being arranged to alternatively actuate said shifting and holding means and to effect such action only during alternative cyclic movement of the shaft responsive to swinging of the detents.

6. In a hay bale stacking machine of the type having a compartment formed by side walls with an open end at the rear and having longitudinally extended rods disposed across the bottom thereof to partially support a hay bale lying thereon and to permit the hay bale to partially drag across the ground and to slide rearwardly from the body through the open rear, a holding means traversing the rear of the compartment adapted to normally hold the bale therein, said holding means comprising an angled arm having one end thereof pivotally connected to the side of the body with the other end thereof being adapted to swing across the rear opening of the compartment to contact the hay bale therein, a toggle lock adapted to normally hold the arm across the opening, but to provide a quick release from such position and comprising a pair of links pivotally connected together and a pivot affixed to the body, the outer end of one link being connected to the arm adjacent to the elbow portion thereof and the outer end of the other link being connected to said pivot, the pivot being positioned such that the links overlie each other in common alignment when the arm extends inwardly into the compartment and are adapted to scissor apart to move the arm outwardly responsive to rotation of the pivot.

7. A hay bale stacker adapted to be connected with and towed by a hay baling machine to receive a group of bales of hay as they are discharged from the machine, to arrange the bales in a rectangular stack a selected number of bales high, a selected number of bales wide, and a selected number of bales long, and to release the stack when it is completed, and comprising in combination therewith:

(a) a box-like body including longitudinal side walls and longitudinal intermediate walls dividing the same into a selected number of compartments, establishing the width of the stack and proportioned such that the width of each compartment is slightly greater than the width of the hay bale, the height of each compartment is sligtly greater than the height of the stack and the length is greater than the length of the stack;

(b) a floor structure adapted to support the stack within the stacker and means associated therewith adapted to permit the stack to slide rearwardly from the same after the stack is so formed;

(c) a chute at the front end of the body adapted to be normally in alignment with one compartment to receive bales from the machine and to guide the same into the compartment, said chute being at a height adapted to permit one bale to be moved onto the top of another to the full height of the stack;

(d) a shifting means at the front end of the body adapted to shift the chute laterally across the body from alignment with one compartment to alignment with another compartment to thereby supply bales to all compartments;

(e) a holding means traversing the compartments at the rear of the body adapted to normally hold bales within the compartments, but being releasable to release bales therefrom;

(f) a trigger means in each compartment adapted to actuate responsive to movement of bales within the compartment when the compartment is filled with bales; and (g) a control means adapted to be actuated by actuation of the trigger means to initiate shifting of the shifting means whenever one compartment is filled with hay bales and to initiate releasing of the holding means whenever all compartments are filled with hay bales to release the stack from the compartment.

8. In the stacker defined in claim 7, including an intermediate holding means traversing the compartments adapted to normally hold a first bale within the forward end of a compartment until other bales are deposited upon the first bale as a pile to the full height of the stack and a releasing means adapted to be tripped by the top bale when positioned above the first and being adapted to thereupon release the intermediate holding means to permit the pile of bales to thereupon shift to the rear of the compartment and provide room for additional piles of bales in the forward end of the compartment.

References Cited by the Examiner

UNITED STATES PATENTS

| 2,822,659 | 2/1958 | Moore | 216—6 |
| 2,971,318 | 2/1961 | Solem et al. | 214—6 |
| 3,163,303 | 12/1964 | Schlake | 214—6 |

FOREIGN PATENTS

| 242,344 | 7/1960 | Australia. |
| 609,807 | 10/1960 | Italy. |

GERALD M. FORLENZA, *Primary Examiner.*

J. E. OLDS, *Assistant Examiner.*